Aug. 5, 1941.     R. T. WALKER     2,251,475
AUTOMATIC SPEED REGULATOR
Filed Sept. 20, 1939     2 Sheets-Sheet 1
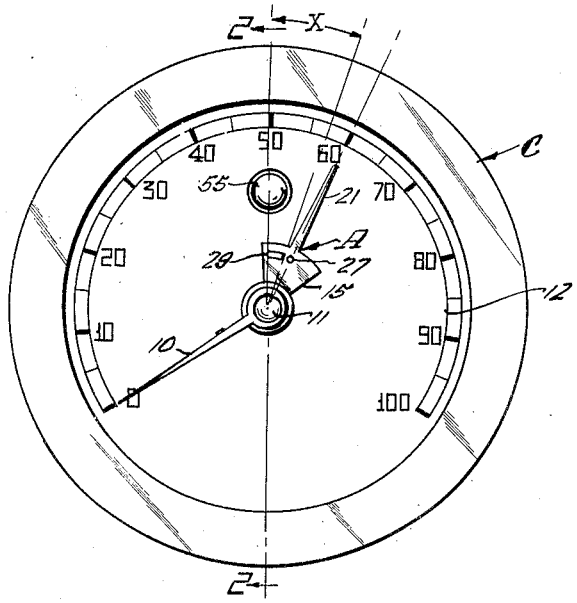
Fig. 1.
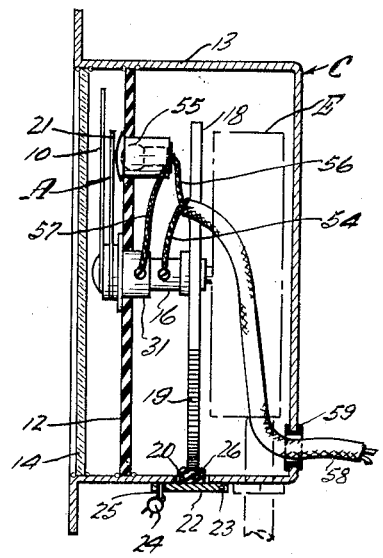
Fig. 2.
Fig. 3.
Fig. 4.
Inventor
RALPH T. WALKER
By Adam E. Fisher
Attorney Aug. 5, 1941.     R. T. WALKER     2,251,475
AUTOMATIC SPEED REGULATOR
Filed Sept. 20, 1939     2 Sheets-Sheet 2

Inventor
RALPH T. WALKER
By Adam E. Fisher
Attorney

Patented Aug. 5, 1941

2,251,475

UNITED STATES PATENT OFFICE 2,251,475

AUTOMATIC SPEED REGULATOR

Ralph T. Walker, Nashville, Tenn.

Application September 20, 1939, Serial No. 295,701

1 Claim. (Cl. 200—56)

The invention relates to speed responsive electrical switches, for use upon automobiles in association with some form of automatic speed regulator, whereby the maximum desirable speed of the vehicle may be pre-set, so that the vehicle may not exceed that speed.

A further object is to provide in combination with the speedometer of an automobile, including a case and circuit controlling contacts therein engageable at a predetermined speed, means for pre-selecting such speed and including a rotatable member adjustably mounted in the case and adjustable through an opening therein, the said opening having a lockable closure, with snubbing means for locking the adjusting member against movement.

With the foregoing objects in view, a preferred embodiment of the invention is shown in the drawings, wherein:

Fig. 1 is a face view or front elevation of a speedometer in which is embodied one form of control unit for effecting the automatic control of peak speed.

Fig. 2 is a medial vertical section along the line 2—2 in Fig. 1.

Fig. 3 is a view similar to Fig. 1 but showing a modified form of control unit built into the speedometer and with a frontal portion of the case broken away to show interior parts.

Fig. 4 is also a medial vertical section taken along the line 4—4 in Fig. 3.

Figure 5:
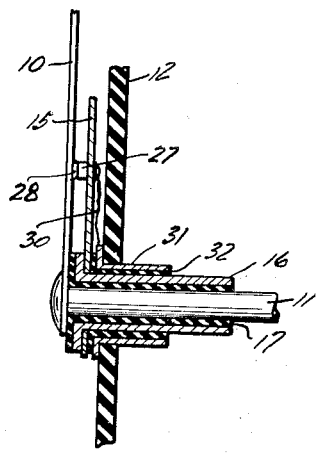
Fig. 5 is an enlarged and fragmentary vertical sectional view through the central hub portion of the unit shown in Fig. 1.

Referring now more particularly to the drawings, my invention comprises a control unit A, associated with or built into the speedometer C, so as to be responsive to the speed of the vehicle.

The control unit, with particular reference to the embodiment thereof shown in Figures 1 and 2, will be first described in detail. The speedometer C is of substantially conventional form and includes a pointer or hand 10 connected to a shaft 11 to be carried thereby over the graduated dial 12 by the usual speed responsive mechanism E. The angular position of the pointer over the dial thus will indicate the speed of the vehicle in usual manner. The dial 12 is arranged at the frontal portion of a case or housing 13 and is protected in usual manner by the lens or window 14. In accordance with my invention the dial itself is preferably made of insulating material while the shaft 11 and pointer 10 are of metal and are connected or grounded electrically to the frame of the vehicle.

In addition to the foregoing more or less conventional parts of the speedometer, I provide also an adjustable contact carrier or member 15 which is journaled upon a metallic carrier sleeve 16 mounted to rotate freely upon the speedometer shaft 11 but insulated therefrom by the insulating sleeve 17. The said carrier sleeve 16 extends rearwardly through the dial 12 a considerable distance and is provided with a fixed adjusting member or disk 18 rotatably arranged within the case 13. The knurled margin 19 of the disk 18 is thus movable in close proximity to an opening 20 formed in the lower portion of the case 13 so that it may be reached and rotated with the finger to thus adjust the carrier 15 to any selected angular position over the dial 12, the selected position with reference to the scale on the dial being indicated by a pointer 21 extended radially from the carrier as shown. To prevent tampering with this setting, once made, a closure member 22 is pivoted at 23 on the case 13 and when swung over the opening 20 may be locked and sealed by a conventional seal 24 placed through a staple 25 as will be apparent. Said closure member 22 carries a sponge rubber snubber or pad 26 which bears upon the knurled edge of the disk 18 to prevent displacement of the parts due to vibration and other causes.

The carrier member 15 bears a control contact 27 which is adapted to be electrically engaged by a brush or movable contact 28 on the hand 10 when this hand reaches a position on the dial scale corresponding to the setting of the carrier member, this action closing circuit from the sleeve 16 to ground. The said carrier member also has an auxiliary signal contact 29 which is located in the same arcuate plane about the axis of shaft 11 to be engaged by the brush 28 prior to its engagement with the control contact 27, this contact 29 being arcuately formed to maintain said engagement over a substantial arc represented at X in Fig. 1. The signal contact is connected by a wire or jumper 30 to a metallic bushing 31 mounted over the sleeve 16 and insulated therefrom by an intervening, tightly fitted sleeve of insulating material. The closing of contacts 28 and 29 will thus complete an electrical circuit from the bushing 31 to ground.

A conventional signal lamp 55 may be mounted in the dial 12 of the speedometer, and is connected by one terminal through wire 56 to the ungrounded pole of a battery (not shown), while the other pole is connected by wire 57 to the bushing 31 and thus to signal contact 29.

The control unit A' shown in Figures 3 and 4 is likewise built into a speedometer C, the speed indicating pointer 10, shaft 11, dial 12, case 13 and operating mechanism E of which are exactly as hereinbefore described. In lieu of the contact assembly of Figures 1 and 2 however, the shaft 11 carries, behind the dial, a rigidly affixed contact disk or member 60 of insulating material but has a metallic contact segment 61 on its margin. This segment 61 is located with its "leading" end in alignment radially with the hand 10 and is secured by screw 62 or other similar means to the shaft 11 to make electrical contact therewith.

The adjusting member or disk 18 is mounted for rotation independently on the shaft 11 behind the disk 60 and may be adjusted in the manner hereinbefore described, the same locking and sealing means being provided as indicated by the corresponding reference numerals. A control contact element or carrier 63 is provided upon this disk 18 and comprises a brush holder 64 in which is slidably mounted a brush 65 urged into sliding engagement with the periphery of the disk 60 by a spring 66 which also makes electrical contact with the brush. A similar signal contact element or carrier 67 is located on disk 18 "ahead" of the element 63 and comprises a holder 68, brush 69 and spring 70. Terminals 71 and 72 make connection between these brushes 65 and 69 and the wires 54 and 57, respectively, so that the circuit remains the same as that previously described. The wiring employed is conventional.

In the operation of the assembly as shown in Figures 1 and 2, as the speedometer hand 10 reaches a point where its brush 20 meets the contact 27, the circuit will be closed through the lamp 55, thus giving the driver additional warning.

In the operation of the assembly as shown in Figures 3 and 4, as the contact segment 61 reaches the brush 69, the lamp 55 will be lighted, and if the speed of the vehicle is further increased, the segment 61 will contact the brush 65 for electrically operating any additional safety device (not shown).

The disk 18 may be cut away where a knurled marginal surface is not required as shown at 73. The contact elements 63 and 67 might also be adjustably mounted upon the speedometer dial or case where so desired.

While I have herein set forth certain preferred embodiments of my invention, it is understood that I may vary from the same in minor details within the scope of the appended claim. Having now therefore fully described my invention, what I claim as new and desire to secure by Letters Patent is:

The combination with a speedometer including a case and having circuit controlling contacts engageable at a predetermined speed as indicated by the speedometer, of means for preselecting said speed and including a rotatable member in the case, the said case having an opening through which access may be had for adjusting said member, a closure for the opening, sealing and locking means for the closure, and the said closure having snubbing means for engaging and locking the said adjusting member against movement.

RALPH T. WALKER.